(12) United States Patent
Wood et al.

(10) Patent No.: US 12,172,137 B2
(45) Date of Patent: Dec. 24, 2024

(54) MICROPOROUS POLYOLEFIN MEMBRANES FROM BESPOKE SOLVENTS

(71) Applicant: Amtek Research International LLC, Lebanon, OR (US)

(72) Inventors: Weston J. Wood, Lebanon, OR (US); Don Spitz, Albany, OR (US); Matthew Alan Warren, Salem, OR (US); Cory S. Rogers, Lebanon, OR (US); Richard W. Pekala, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 0 days.

(21) Appl. No.: 18/408,372

(22) Filed: Jan. 9, 2024

(65) Prior Publication Data

US 2024/0139689 A1 May 2, 2024

Related U.S. Application Data

(60) Division of application No. 18/490,621, filed on Oct. 19, 2023, which is a continuation of application No. PCT/US2023/060674, filed on Jan. 13, 2023.
(Continued)

(51) Int. Cl.
*B01D 71/26* (2006.01)
*B01D 67/00* (2006.01)
*B01D 69/02* (2006.01)

(52) U.S. Cl.
CPC ..... *B01D 71/261* (2022.08); *B01D 67/00091* (2022.08); *B01D 67/0013* (2013.01);
(Continued)

(58) Field of Classification Search
None
See application file for complete search history.

(56) References Cited

U.S. PATENT DOCUMENTS

2002/0001753 A1 1/2002 Pekala et al.
2009/0171001 A1 7/2009 Lin et al.
(Continued)

FOREIGN PATENT DOCUMENTS

JP 2004119527 A 4/2004
KR 20160129538 A 11/2016
(Continued)

OTHER PUBLICATIONS

MSDS of Shellflex 371 (Year: 1999).*
(Continued)

*Primary Examiner* — Krishnan S Menon
(74) *Attorney, Agent, or Firm* — Dorsey & Whitney LLP (57) ABSTRACT

Halogen-free, microporous polyolefin membranes are disclosed herein. The halogen-free, microporous polyolefin membranes can be manufactured using an environmentally friendly manufacturing process that includes extrusion of polymer-plasticizer mixtures followed by sheet formation and extraction of the plasticizer with a halogen-free solvent. The halogen-free solvent has a flashpoint greater than about 23° C. and an initial boiling point at least about 50° C. lower than the flashpoint of the plasticizer. The process can further be a closed loop process in which the halogen-free solvent can be reused.

21 Claims, 2 Drawing Sheets

Related U.S. Application Data (60) Provisional application No. 63/266,830, filed on Jan. 14, 2022.

(52) U.S. Cl.
CPC ......... *B01D 67/0027* (2013.01); *B01D 69/02* (2013.01); *B01D 2323/20* (2013.01); *B01D 2323/21* (2013.01); *B01D 2325/04* (2013.01); *B01D 2325/52* (2022.08)

(56) References Cited

U.S. PATENT DOCUMENTS

| | | | |
|---|---|---|---|
| 2009/0246503 A1 | 10/2009 | Parrinello et al. | |
| 2016/0372732 A1 | 12/2016 | Miller et al. | |
| 2017/0072610 A1* | 3/2017 | Miller | H01M 8/1051 |

FOREIGN PATENT DOCUMENTS

| | | |
|---|---|---|
| KR | 20160129567 A | 11/2016 |
| WO | 2009078478 A1 | 6/2009 |
| WO | 2012062011 A1 | 5/2012 |
| WO | 2012150618 A1 | 11/2012 |

OTHER PUBLICATIONS

F. Toquet et al. / Polymer 97 (2016) 63e68 (Year: 2016).*

International Search Report and Written Opinion dated May 1, 2023 received in international patent application No. PCT/US2023/060674.

International Search Report and Written Opinion dated Sep. 29, 2022 received in PCT/US2022/072875.

Non-Final Office Action dated Mar. 20, 2024 issued in U.S. Appl. No. 18/490,621.

Pradeep K. Sharma et al., "Solvent Recovery by Steamless Temperature Swing Carbon Adsorption Processes" Industrial & Engineering Chemistry Research, 2010, 49, 11602-11613, Published on Web Oct. 26, 2010.

Final Office Action dated Aug. 16, 2024 issued in U.S. Appl. No. 18/490,621.

Shell Edelex Oil 946 Technical data sheet, 2014.

Toquet et al., "Effect of the naphthenic oil and precipitated silica on the crystallization of ultrahigh-molecular-weight polyethylene," Polymer 97 (2016) 63-68.

\* cited by examiner

MICROPOROUS POLYOLEFIN MEMBRANES FROM BESPOKE SOLVENTS

RELATED APPLICATIONS

This application is a divisional of U.S. patent application Ser. No. 18/490,621, filed on Oct. 19, 2023, and titled Microporous Polyolefin Membranes from Bespoke Solvents, which is a continuation of PCT Application No. PCT/US2023/060674, filed on Jan. 13, 2023, and titled Microporous Polyolefin Membranes from Bespoke Solvents, which claims priority to U.S. Provisional Patent Application No. 63/266,830, filed on Jan. 14, 2022, and titled Microporous Polyolefin Membranes from Bespoke Solvents, each of which is incorporated herein by reference in its entirety.

COPYRIGHT NOTICE

© 2024 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This invention relates to halogen-free, microporous polyolefin membranes that can be manufactured in an environmentally-friendly, closed loop process that includes the extrusion of polymer-plasticizer mixtures followed by sheet formation, extraction of the plasticizer with a solvent, evaporation of the solvent to form micropores, and subsequent adsorption-desorption of the solvent from activated carbon for re-use in the manufacturing process. The bespoke solvent is halogen-free, has low water solubility, and a flashpoint above about 23° C. In terms of Hansen solubility parameters, in some instances the solvent has low dispersion (delta D~15), low polar (delta P~0), and low hydrogen bonding (delta H~0) characteristics such that it is miscible with plasticizers that include naphthenic, paraffinic, and white mineral oils. Finally, the relative boiling points are critical for (1) separation and recycling of the plasticizer and bespoke solvent.

BACKGROUND OF THE INVENTION

Microporous membranes have a structure that is designed for fluid flow through them. The fluid can be either a liquid or a gas, and generally the pore size of the membrane must be at least several times the mean free path of the fluid to achieve the desired flux. The pore size range for microporous membranes is generally from about 10 nanometers to several microns, with an average pore size less than about 1 micrometer. Such membranes are generally opaque because the pore size and polymer matrix are of sufficient size to scatter visible light. The term "microporous membrane" as used, is inclusive of other descriptions used in the scientific and patent literature such as "microporous films", "microporous sheets", and "microporous webs". The microporous membranes can also exhibit free-standing properties, and have interconnected pores that extend throughout the membrane. "Free-standing" refers to a membrane having sufficient mechanical properties that permit manipulation such as winding and unwinding in sheet form for use in an energy storage device assembly.

Microporous membranes have been utilized in a wide variety of applications such as filtration, breathable films for garment or medical gown applications, battery separators, synthetic printing sheets, and as surgical dressings. In some cases, the microporous membranes are laminated to other articles (e.g., a non-woven) to impart additional functionality (e.g., tear resistance, oxidation resistance). The microporous membrane may also undergo machine-direction or transverse-direction stretching as part of the manufacturing process or in a secondary step.

The manufacture of microporous membranes is often accomplished by thermally induced phase separation. In this process, a homogeneous mixture is formed by melt blending the polymer with a thermally stable plasticizer (e.g., a paraffin oil) at elevated temperature, and then casting or extruding into a non-porous film or object which is cooled to induce phase separation of the polymer and plasticizer often as a result of polymer re-crystallization. The plasticizer is then removed by solvent extraction and drying to form a microporous membrane. In order to facilitate the separation and recycling of solvent and plasticizer, it is important that their initial boiling points be greater than about 50° C. apart (e.g., for efficient separation during distillation).

DETAILED DESCRIPTION

Battery separators are commonly manufactured using a thermally induced phase separation process, followed by extraction of the thermally stable plasticizer with hexane, trichloroethylene, methylene chloride, or other solvents. Government regulatory agencies continue to conduct risk evaluations on such solvents and have concerns regarding environmental and worker exposures.

Most flooded lead acid batteries include polyethylene separators. The term "polyethylene separator" is a misnomer because these microporous separators require large amounts of precipitated silica to be sufficiently acid wettable. The volume fraction of precipitated silica and its distribution in the separator generally controls its electrical (ionic) properties, while the volume fraction and orientation of polyethylene in the separator generally controls its mechanical properties. The porosity range for commercial polyethylene separators for lead acid batteries is generally about 50-65%.

In the manufacture of Pb-acid separators, precipitated silica is combined with a polyolefin, a plasticizer (i.e., process oil), and various minor ingredients to form a separator mixture that is extruded at elevated temperature through a sheet die to form an oil-filled sheet. The oil-filled sheet is calendered to its desired thickness and profile, and the majority of the process oil is extracted with an organic solvent; however, there is typically about 10-25% residual oil, more preferably about 12-22% process oil left in the final separator. A naphthenic process oil is preferred and the residual oil is intended to increase the oxidation resistance of the Pb-acid battery separator. Hexane and trichloroethylene have been the two most common solvents used in Pb-acid separator manufacturing. The solvent-laden sheet is then dried to form a microporous polyolefin separator and is slit into an appropriate width for a specific battery design.

The polyethylene separator is delivered in roll form to lead acid battery manufacturers where the separator is fed to a machine that forms "envelopes" by cutting the separator material and sealing its edges such that an electrode can be inserted to form an electrode package. The electrode packages are stacked such that the separator acts as a physical spacer and an electronic insulator between positive and negative electrodes. Sulfuric acid is then introduced into the assembled battery to facilitate ionic conduction between the electrodes.

The primary purposes of the polyolefin contained in the separator are to (1) provide mechanical integrity to the polymer matrix so that the separator can be enveloped at high speeds and (2) to prevent grid wire puncture during battery assembly or operation. Thus, the hydrophobic polyolefin preferably has a molecular weight that provides sufficient molecular chain entanglement to form a microporous web with high puncture resistance. The primary purpose of the hydrophilic silica is to increase the acid wettability of the separator web, thereby lowering the electrical resistivity of the separator. In the absence of silica, the sulfuric acid would not wet the hydrophobic web and ion transport would not occur, resulting in an inoperative battery. Consequently, the silica component of the separator typically accounts for between about 55% and about 80% by weight of the separator, i.e., the separator has a silica-to-polyethylene weight ratio of between about 2.0:1 and about 3.5:1.

The manufacture of microporous membranes for synthetic printing applications is exemplified by Schwarz et al in U.S. Pat. No. 5,196,262. In this case, the polymer matrix constitutes a blend of ultrahigh molecular weight polyethylene (UHMWPE) having an intrinsic viscosity greater than about 10 dl/g and lower molecular weight polyethylene with a melt flow index less than about 50 g/10 min (ASTM D 1238-86 condition). These polymers are combined with a high percentage of finely divided, water-insoluble siliceous filler, other minor ingredients, and a processing plasticizer to form a mixture that is subsequently extruded into a sheet from which the majority of the plasticizer is extracted with a solvent. The residual plasticizer is less than about 3 wt %, more preferably less than about 1%, of the synthetic printing sheet. Examples of suitable organic extraction liquids include trichloroethylene, perchloroethylene, methylene chloride, hexane, heptane, and toluene. The resultant microporous membranes are sold by PPG Industries under the Teslin® trademark.

Separators designed for Li-ion, Li-metal, or rechargeable Li-metal battery systems are commonly manufactured using a thermally induced phase separation process. In this case, various grades of polyethylene ranging in molecular weight from about 0.5 million g/mol to about 10 million g/mol are combined with a plasticizer and then extruded through a sheet die or annular die to form an oil filled sheet. The oil-filled sheet is often biaxially oriented to decrease its thickness and improve mechanical properties in both the machine- and transverse-directions. Next, the biaxially-oriented sheet is most often passed through an extraction bath of methylene chloride to remove the plasticizer and subsequently create pores upon evaporation of the solvent. The resultant battery separator typically has thickness in the about 3-25 um range with porosity between about 40-65%, and less than about 1% residual plasticizer.

In the case of chlorinated solvents such as trichloroethylene (TCE), it has been shown that it can absorb into the amorphous regions of a polyethylene article and adsorb to the surface of polyethylene powder. (See e.g., Shuai Xie et al., Very Low Concentration Adsorption Isotherms of Trichloroethylene on Common Building Materials, Building and Environment, Vol. 179, 2020 Jul. 15.) The same mechanisms can apply to battery separators, where the chlorinated solvent can remain within the material even after passing through a drying oven at elevated temperature. In some cases, the chlorinated solvent can remain within any residual plasticizer or oil that was used to extrude the separator precursor.

In response to ongoing environmental pressures and health concerns related to organic solvents such as trichloroethylene, methylene chloride, and hexane, there is a need for a new sustainable approach to the manufacture of microporous membranes that can meet customer performance requirements from a process that minimizes worker exposure to potentially harmful chemicals and efficiently recycles the extraction solvent and plasticizer in a closed loop. The components of the microporous membranes disclosed herein, including the solvents and plasticizers used in the manufacture thereof, can be environmentally friendly and safe for handling. The solvents can also be food-grade, minimizing health concerns with the handling thereof.

In the manufacture of microporous membranes using thermally induced phase separation, the main considerations for solvent selection include physical properties, chemical properties, equipment compatibility, safety, recyclability, cost, and the ability to achieve the desired product characteristics (e.g., pore size distribution). A summary of solvent selection criteria are shown in Table I below:

TABLE I

1. Physical Properties
    Boiling point
    Flash point
    Vapor pressure
    Density
    Viscosity
    Surface tension
    Heat of vaporization
2. Chemical Properties
    Oil solvency
    Water solubility
    Reactivity
    Corrosiveness
3. Process Compatibility
    Equipment design & engineering
    Tooling
    Throughput rate
    Solvent recovery
    Vapor recovery
4. Product Characteristics
    Mechanical properties
    Electrical (ionic) resistance
    Oxidation resistance
    Electrochemical compatibility
    Cost It is difficult to identify a single solvent, particularly one that is non-flammable, that can meet all of the selection criteria while also minimizing health and environmental risks. With continued pressure from REACH and EPA to eliminate chlorinated solvents such as trichloroethylene and methylene chloride as extraction solvents for the production of microporous membranes used as battery separators, a new approach is required. While certain azeotropes have been proposed as substitutes for trichloroethylene and methylene chloride, they usually contain trans-dichloroethylene (i.e., a chlorinated solvent) combined with various fluoro-compounds which fall under the category of perfluoro alkyl substances (PFAS). The latter are under increased scrutiny because of their environmental persistence (i.e., they do not degrade) and associated health risks.

In terms of physical and chemical properties of the solvent, it is important to consider them in relation to those of the plasticizer. Key considerations include the flashpoint, boiling point range, and aniline point of the solvent and plasticizer. For instance, the flashpoint of the plasticizer can be important for extrusion. In particular, the flashpoint of the plasticizer should be higher than the extrusion temperature, which is generally greater than about 215° C. during the manufacture of polyolefin battery separators. Thus, in some embodiments, the plasticizer has a flashpoint above about 215° C. In another embodiment, the plasticizer has a flashpoint above about 145° C. (e.g., such as from about 145° C. to about 350° C., or from about 145° C. to about 300° C.). For the extraction solvent, it is prudent that the flashpoint be above room temperature (greater than about 23° C.) so that sufficient thermal energy can be utilized to facilitate evaporation and pore formation in the membrane, while mitigating the risk of fire. Thus, in some embodiments, the flashpoint of the extraction solvent is greater than about 23° C. In further embodiments, the flashpoint of the extraction solvent is greater than about 38° C. to satisfy certain code and/or fire code requirements (e.g., such as the NFPA 30 Flammable and Combustible Liquids Code, the NFPA 1 Fire Code; and/or the International Fire Code as recognized in 2022-2023).

Because vapor pressure and volatility of a solvent generally correlate with the boiling point, it is important that a temperature range be selected to minimize potential worker exposure while maximizing the ability to separate the solvent from the plasticizer with the lowest possible amount of energy. In addition, in some embodiments, it is important that the solvent has an initial boiling point that is at least about 50° C. lower than the flashpoint of the plasticizer to more easily achieve separation through distillation. In additional embodiments, the solvent has an initial boiling point that is at least about 85° C. lower than the flashpoint of the plasticizer. It will be appreciated that the initial boiling point of the plasticizer will always be higher than its flashpoint (to the extent the plasticizer has a flashpoint). Thus, stated another way, with respect to initial boiling points, the solvent has an initial boiling point that is at least about 50° C., or at least about 85° C., lower than the initial boiling point of the plasticizer. The difference in initial boiling points and/or flashpoints between the solvent and the plasticizer is helpful for efficient distillation and separation of the components such that one or both components can be recycled and reused in the manufacturing process, as further described below in relation to FIGS. 1 and 2. In some instances, it is preferable to have the difference in initial boiling points and/or flashpoints between the solvent and the plasticizer as great as possible.

Next, the aniline point is relatively simple test to measure the solvency power of a hydrocarbon. Aniline is a simple aromatic amine with an amino group attached to a benzene ring. The aniline point is the lowest temperature at which a 1:1 mixture of a solvent or plasticizer with aniline remains a clear solution. A low value indicates a stronger solvency power, while a high value corresponds to weaker solvency. In some embodiments, solvents having a lower aniline point may be used, such as in Pb-acid separators where residual plasticizer can be left behind and remain in the resulting separator. In other embodiments, solvents having either a lower or higher aniline point may be used, such as in Li separators where all or substantially all of the plasticizer is removed from the resulting separator.

In general, a higher aniline point means a relatively low level of dissolved aromatics. Such a difference can clearly be observed for paraffinic versus naphthenic plasticizers as shown in the carbon type analysis (ASTM D2140). As the paraffinic carbons decrease in the different plasticizers, and correspondingly, the naphthenic and aromatic carbons increase, the aniline point also decreases. It should be noted that the flashpoint follows a similar trend.

In the case of hydrocarbon solvents, the aniline point generally decreases as the alkane chain length decreases or degree of aromaticity increases. The above trends and relationships can be observed in Table II.

TABLE II

| Chemical Name | Molecular Wt or chemical description | Density (g/cc) | Boiling Pt (° C.) | Distillation Range (° C.) | Flashpoint (° C.) | Evaporation Rate @ 25 C. (n-BuAc = 200) |
|---|---|---|---|---|---|---|
| Solvents | | | | | | |
| Toluene | 92 | 0.87 | 110.5 | 109-111 | 8.9 | 200 |
| Xylene | 106 | 0.869 | 140 | 136-144 | 31.6 | 77 |
| Hexane | 86 | 0.682 | 68.7 | 64-74 | −18 | 765 |
| Heptane | 100 | 0.684 | 98.4 | 95-99 | −1 | 275 |
| Decane | 142 | 0.73 | 174 | 172-177 | 45 | 7 |
| IsoPar-E | C8-9 Isoparaffin | 0.723 | — | 115-140 | 4 | 170 |
| IsoPar-G | C10-11 Isoparaffin | 0.746 | — | 152-177 | 44 | 16 |
| IsoPar-H | C11-12 Isoparaffin | 0.761 | — | 181-193 | 60 | 5.7 |
| IsoPar-L | C11-13 Isoparaffin | 0.764 | — | 185-198 | 66 | 4.4 |
| Plasticizers | | | | | | |
| Shell Ricolia 430X | Paraffinic base | 0.828 | — | 422-589 | 268 | nil |
| Nynex Nypar 330 | Paraffinic base | 0.871 | — | 395-610 | 262 | nil |
| H&R Pionier 2058 | Paraffinic base | 0.875 | — | N/A | 262 | nil |
| Calumet Cabot 930 | Paraffinic base | 0.875 | — | 380-539 | 240.6 | nil |
| Liquid Paraffin (LP) | Paraffinic base | 0.825 | — | 280-350 | 150 | nil |
| Calumet Hydrocal 750 | Naphthenic base | 0.912 | — | N/A | 225 | nil |
| Nynas Nytex 820 | Naphthenic base | 0.917 | — | 340-535 | 226 | nil |

TABLE II-continued

| | | Carbon Type Analysis (ASTM D2140) | | |
|---|---|---|---|---|
| Chemical Name | Aniline Pt (° C.) | Cp (paraffinic carbons) | Cn (naphthenic carbons) | Ca (aromatic carbons) |
| Solvents | | | | |
| Toluene | 8 | — | — | — |
| Xylene | 9 | — | — | — |
| Hexane | 65 | — | — | — |
| Heptane | 68 | — | — | — |
| Decane | 77 | — | — | — |
| IsoPar-E | 73 | — | — | — |
| IsoPar-G | 77 | — | — | — |
| IsoPar-H | 81 | — | — | — |
| IsoPar-L | 81 | — | — | — |
| Plasticizers | | | | |
| Shell Ricolia 430X | 132.8 | >99 | 0 | 0 |
| Nynas Nypar 330 | 126 | 70 | 29 | <1 |
| H&R Pionier 2058 | 119 | 87 | 33 | 0 |
| Calumet Cabot 930 | 115.8 | 65 | 35 | 0 |
| Liquid Paraffin (LP) | ~102-110 | >99 | 0 | 0 |
| Calumet Hydrocal 750 | 97.5 | 54 | 36 | 19 |
| Nynas Nytex 820 | 83.9 | 49 | 40 | 11 |

In some instances, a larger difference in the aniline points of the solvent and plasticizer results in faster extraction; however, a bespoke solvent is required to meet the other criteria outlined above for efficient recycling in a closed loop process. In some embodiments, the aniline point of the plasticizer is between about 70° C. and about 140° C., between about 75° C. and about 135° C., or between about 80° C. and about 130° C. In another embodiment, the aniline point of the plasticizer is between about 35° C. and about 140° C. Surprisingly, we have found that IsoPar-G can meet the requirements for next generation solvent extraction and recovery processes for the manufacture of microporous membranes using plasticizers that include naphthenic, paraffinic, and white mineral oils. Other solvents that meet the criteria outlined above, including both solvents identified in Table II and solvents not identified in Table II can also be used.

In some embodiments, the solvent is used to extract the plasticizer after the non-porous film is stretched or biaxially oriented. In further embodiments, the resultant microporous polyolefin membrane is further stretched and/or biaxially oriented after extracting the plasticizer. The resultant microporous polyolefin membrane is also entirely free of any halogen-containing compounds (such as residual halogen-containing compounds) because the extraction solvent is halogen-free. This is in contrast to microporous polyolefin membranes manufactured with a halogen-containing extraction solvent such as methylene chloride or trichloroethylene, which can include trace amounts of residual halogen-containing compounds. It should be recognized that trace amounts of residual halogen-containing compounds can potentially cause corrosion or other problems in the performance of rechargeable lithium-ion or lithium metal-based batteries.

The microporous polyolefin membranes disclosed herein can be made with a variety of polyolefins. Exemplary polyolefins that can be used include, but are not limited to, various grades of polyethylenes, such as polyethylenes ranging in molecular weight from about 0.5 million g/mol to about 10 million g/mol (e.g., including ultrahigh molecular weight polyethylene (UHMWPE), very high molecular weight polyethyelene (VHMWPE), high molecular weight, high-density polyethylene (HMW-HDPE), and mixtures thereof), polypropylenes, polymethylpentenes, and mixtures thereof. In particular embodiments, the polyolefin includes a polyethylene having a molecular weight of about 0.5 million g/mol or greater, or about 0.6 million g/mol or greater.

The thickness of the microporous polyolefin membranes can vary. In some embodiments, the microporous polyolefin membrane comprises a backweb thickness of about 25 microns or less, or about 20 microns or less. In certain embodiments, the microporous polyolefin membrane comprises a backweb thickness of between about 5 and about 25 microns, or between about 5 and about 20 microns. Microporous polyolefin membranes having a greater thickness can also be made, such as those having a backweb thickness of between about 150 microns and about 300 microns, etc. As used herein, backweb thickness can refer to the thickness of the microporous polyolefin membrane that does not include the height of any ribs or surface protrusions.

The microporous polyolefin membranes can also optionally include a filler. Exemplary fillers that can be used include inorganic oxides, carbonates, or hydroxides, such as, for example, alumina, silica, zirconia, titania, mica, boehmite, magnesium hydroxide, calcium carbonate, hydrotalcites, and mixtures thereof. The filler can be distributed throughout the microporous polyolefin membrane. In some embodiments, the filler is uniformly distributed throughout the microporous polyolefin membrane. In other embodiments, the filler is not uniformly distributed.

The microporous polyolefin membranes can also optionally be annealed or heat stabilized as part of the manufacturing process, after the extraction process and prior to being wound into a roll for later use.

The following examples are illustrative in nature and not intended to be limited in any way.

Example 1

UHMWPE (Celanese GUR 4150), precipitated silica (PPG WB-2085), and minor ingredients (antioxidant, plasticizer, and carbon black) were combined in a horizontal mixer and blended with low speed agitation to form a homogeneous mix. Next, a hot naphthenic plasticizer (ENTEK 800 oil; Calumet) was sprayed onto the dry ingredients. This mix contained ~58 wt. % oil and was then fed to a 96 mm counter-rotating twin screw extruder (ENTEK Manufacturing Inc) operating at a melt temperature of ~215° C. Additional process oil was added in-line at the throat of the extruder to give a final oil content of ~65 wt %. The resultant mass was passed through a sheet die into a calendar and embossed with a rib pattern and a thickness of ~200-300 um. After passing over two cooling rolls, the oil-filled sheet was collected for extraction.

A ~160 mm×~160 mm oil-filled sample was placed in beaker containing IsoPar-G and was extracted with agitation for ~10 minutes at room temperature. The solvent laden sample was then dried in a circulating oven overnight at 105° C. The resultant separator was porous, had good mechanical properties, and contained 16 wt % residual oil (i.e., plasticizer). As the solvent was free of halogen-containing compounds, the resultant separator was also free of residual halogen-containing compounds.

Example 2

A naphthenic plasticizer (140 kg; ENTEK 800 oil; Calumet) was dispensed into a Ross mixer where it was stirred and degassed. Next, the following were added and mixed with the oil:

| | |
|---|---|
| 64 kg | UHMWPE (Molecular weight ~ 5 million g/mol) |
| 32 kg | VHMWPE (Molecular weight ~ 1 million g/mol) |
| 32 kg | HMW-HDPE ( Molecular weight ~ 0.6 million g/mol) |
| 1.2 kg | Li Stearate |
| 1.2 kg | Anti-oxidant |

The mixture was blended at ~40° C. until a uniform 47 w/w % polymer slurry was formed. The polymer slurry was then pumped into a 73 mm diameter, co-rotating twin screw extruder, while a melt temperature of ~215° C. was maintained. The extrudate passed through a melt pump that fed a 257 mm diameter annular die having a 2.75 mm gap. The throughput through the die was 135 kg/hr, and the extrudate was inflated with air to produce a biaxially oriented, oil-filled film with a ~2000 mm diameter, which then passed through an upper nip at 20 m/min to collapse the bubble and form a double layer, which was subsequently side-slit into 2 individual layers.

Figure 1:
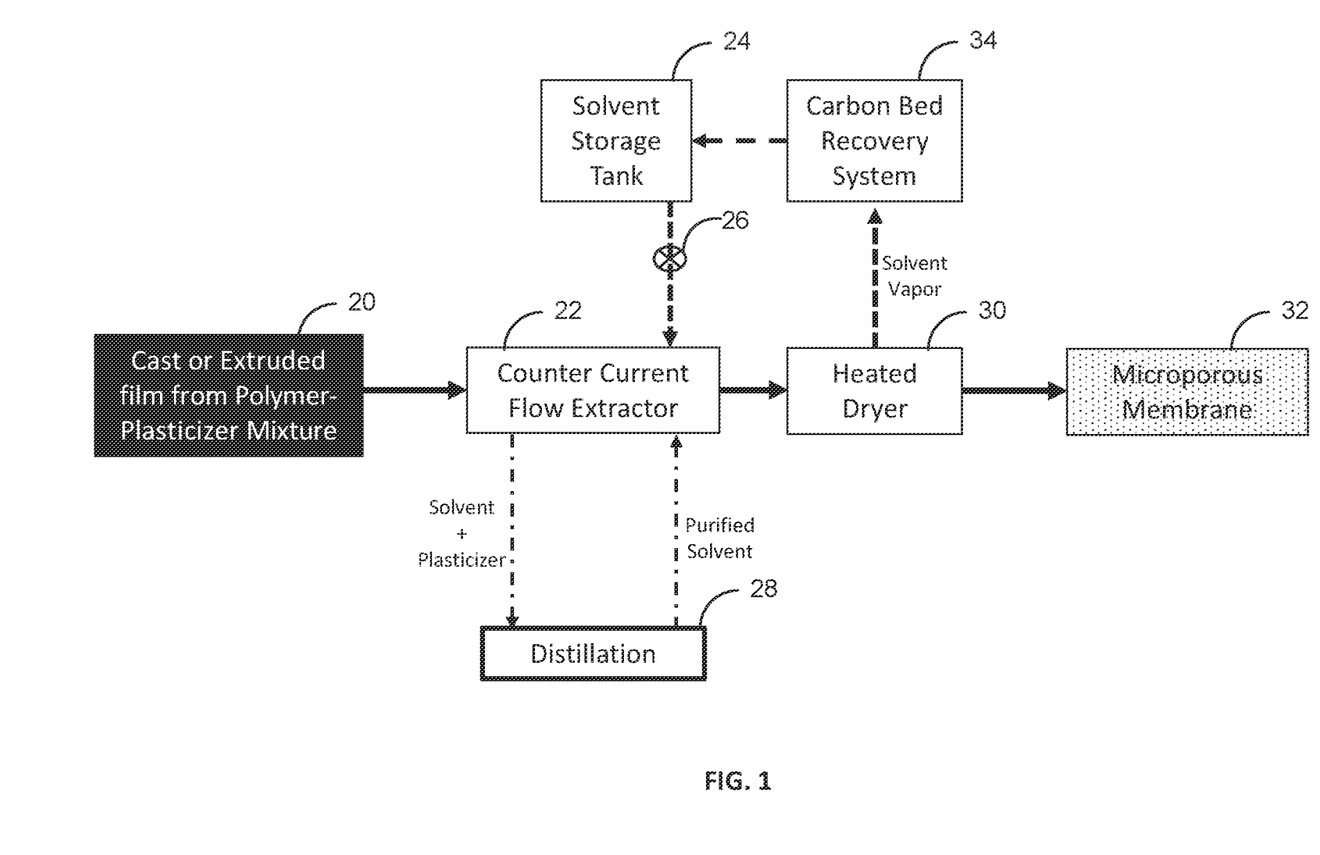
FIG. 1 is a diagram depicting a closed loop solvent extraction and carbon bed recovery method used in the manufacture of microporous membranes in accordance with one embodiment.
Figure 2:
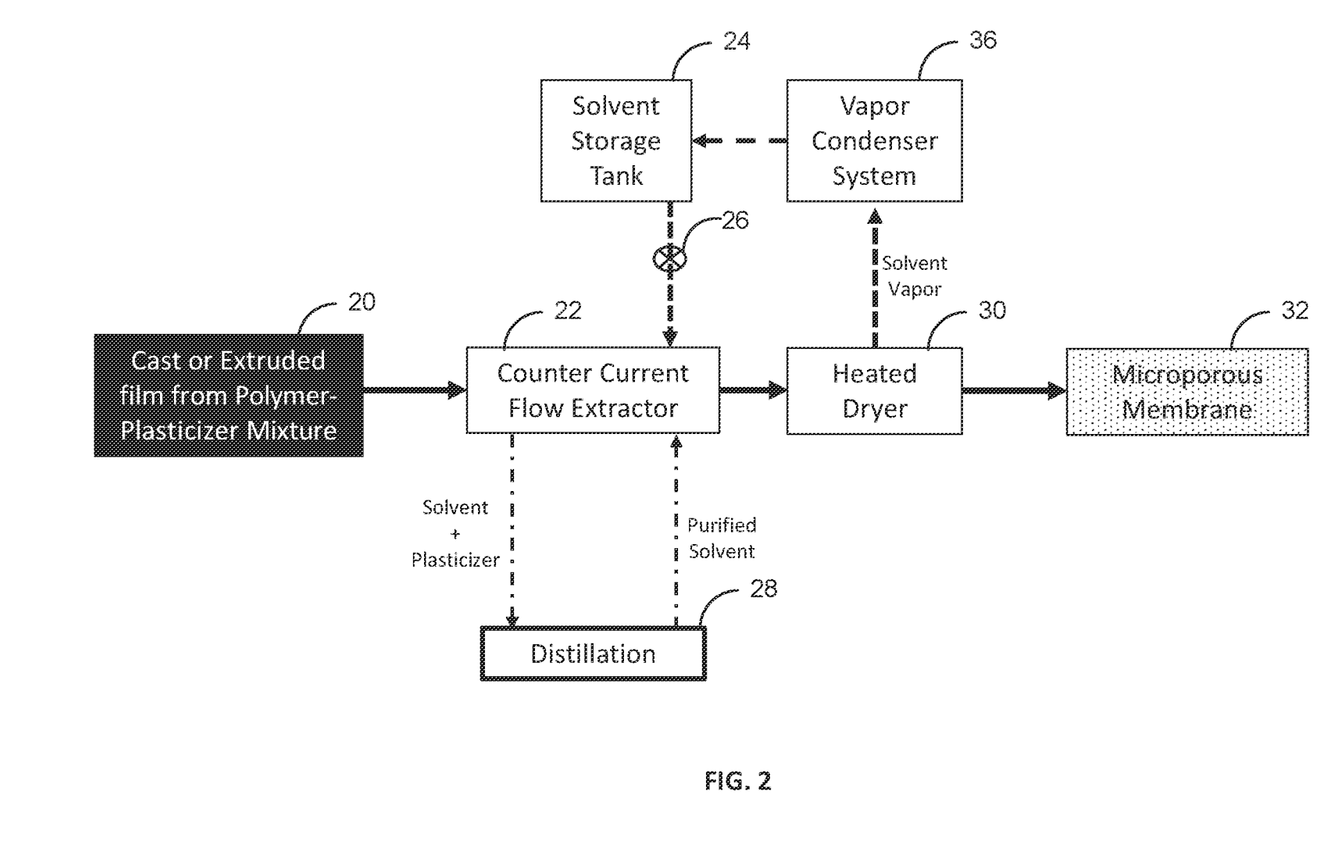
FIG. 2 is a diagram depicting a closed loop solvent extraction and vapor condensing recovery method used in the manufacture of microporous membranes in accordance with another embodiment.

The oil-filled layers then passed through an extractor in which IsoPar-G flowed counter-current to the direction of the layers. The oil/IsoPar-G mixture in the first zone of the extractor was pumped to a distillation unit and separated for re-use. The solvent-laden layers then passed into an oven with air knives to evaporate off the IsoPar-G solvent with the vapor being sent to a carbon bed system for adsorption and subsequent recovery with steam. Such an exemplary closed loop manufacturing method is depicted in FIG. 1. Another exemplary closed loop manufacturing method is depicted in FIG. 2, which utilizes a vapor condenser system rather than a carbon bed recovery system. Finally, the extracted layers were stretched 1.5× in an MDO (Machine Direction Orientation) with 80° C. roll temperatures followed by 2.0× in a TDO (Transverse Direction Orientation) operating at 128° C. MDO refers to orientation in the machine direction, or along the direction that the material is being fed; while TDO refers to orientation along the transverse direction; or along a direction that is 90 degrees to the machine direction.

The microporous layers then passed through a nip and were separated and then wound as individual rolls on a dual turret winder. The resultant battery separator was ~20 um thick with an average Gurley air permeability value of 150 secs/100 cc air. The residual plasticizer was determined to be 0.6% based upon thermogravimetric analysis. As the solvent was free of halogen-containing compounds, the resultant separator was also free of residual halogen-containing compounds.

With reference to FIGS. 1 and 2, a non-porous, plasticizer-filled film formed from a cast or an extruded polymer-plasticizer mixture 20 is passed through a countercurrent flow extractor 22. A solvent supplied from a solvent storage tank 24 and flow controlled by a fluid valve 26 flows into countercurrent flow extractor 22 in a direction opposite to that of the film. Extractor 22 produces in a first internal zone a plasticizer solvent mixture, which is pumped to a distillation unit 28, where the plasticizer and solvent are separated for reuse. Distillation unit 28 produces a solvent condensate in a purified state. The purified solvent is returned to a second internal zone of countercurrent flow extractor 22 for reuse in combination with solvent supplied from solvent storage tank 24. The solvent-laden film exits countercurrent flow extractor 22 and is passed into a heated dryer 30, which is a source of heat equipped with air knives that evaporate off the solvent and thereby produce a solvent vapor. A microporous membrane 32 emerges from heated dryer 30. The microporous membrane can be further stretched or annealed before being wound into roll form.

In the solvent recovery system embodiment of FIG. 1, the solvent vapor produced by operation of heated dryer 30 is recovered by adsorption-desorption with use of a carbon bed system 34. The solvent vapor evaporates onto activated carbon, which adsorbs the solvent. Steam is then used to thermally desorb the solvent from the activated carbon for delivery to storage tank 24.

In the solvent recovery system embodiment of FIG. 2, the solvent vapor produced by operation of heated dryer 30 is recovered by a vapor condenser system 36. The solvent vapor enters vapor condenser system 36 for extraction of the latent heat of vaporization from the solvent vapor to thereby cool and condense the solvent. The recovered solvent is delivered to storage tank 24.

FIGS. 1 and 2 show an outlet of solvent storage tank 24 connected through fluid valve 26 to countercurrent flow extractor 22. This configuration implements closed loop solvent recovery system embodiments in which the recovered solvent washes over the plasticizer-filled film to continue plasticizer removal from the sheet passing through countercurrent flow extractor 22.

In some cases, it may be advantageous to combine use of activated carbon and vapor condenser solvent recovery systems for efficient recovery and recycling of the solvent. Skilled persons will appreciate that solvent/water liquid phase separation may be a necessary part of the recovery process where steam is utilized as a heat source.

Example 3

A naphthenic plasticizer (140 kg; ENTEK 800 oil; Calumet) was dispensed into a Ross mixer where is was stirred and degassed. Next, the following were added and mixed with the oil:

| | |
|---|---|
| 64 kg | UHMWPE (Molecular weight ~ 5 million g/mol) |
| 32 kg | VHMWPE (Molecular weight ~ 1 million g/mol) |
| 32 kg | HMW-HDPE ( Molecular weight ~ 0.6 million g/mol) |
| 1.2 kg | Li Stearate |
| 1.2 kg | Anti-oxidant |

The mixture was blended at ~40° C. until a uniform 47 w/w % polymer slurry was formed. The polymer slurry was then pumped into a 103 mm diameter, co-rotating twin screw extruder, while a melt temperature of ~215° C. was maintained. Simultaneously, fumed alumina/HDPE/oil pellets were fed into the extruder. The extrudate passed through a melt pump that fed a 257 mm diameter annular die having a 2.75 mm gap. The throughput through the die was 230 kg/hr, and the extrudate was inflated with air to produce a biaxially oriented, oil-filled film with a ~2250 mm diameter, which then passed through an upper nip at 20 m/min to collapse the bubble and form a double layer, which was subsequently side-slit into 2 individual layers.

An individual oil-filled layer (~44 um thick) was then restrained in a metal frame that was clamped together. A ~200 mm×~200 mm area of the oil-filled layer was then exposed to an excess quantity of IsoPar-G for ~15 mins at room temperature while the solvent was agitated. The solvent-laden, alumina-filled PE film was then dried in a circulating air oven for ~10 min at 105° C. The membrane was then removed from the frame and found to have a thickness of 12 um with an average Gurley air permeability value of ~50 secs/100 cc. The residual plasticizer was 0.8 wt % as determined by thermogravimetric analysis. As the solvent was free of halogen-containing compounds, the membrane was also free of residual halogen-containing compounds.

Example 4

UHMWPE (37.4 kg, ~5 Million g/mol), lithium stearate (0.43 kg), antioxidant (0.37 kg), and a naphthenic plasticizer (132.6 kg, ~12 cP at 100° C.; ENTEK 800 oil; Calumet) were blended together in a Ross mixer to form a 22 wt. % polymer slurry. This slurry was pumped into a twin screw extruder at 170 kg/hr, while a melt temperature of >200° C. was maintained. The extrudate passed through a melt pump that fed a 257 mm diameter annular die having a 2.75 mm gap. The extrudate was inflated with air to produce a biaxially oriented film with a 2000 mm diameter, which was subsequently passed through an upper nip at 14.5 m/minute to collapse the bubble and form a double layer. The collapsed double layer sheet was slit open on both edges and then conveyed through an extractor tank filled with IsoPar-G to remove the plasticizer. Next, the extracted sheet was sequentially stretched in the machine direction (1.83×) and transverse direction (2.9×) at 100° C. (~1% relax), and then wound in roll form onto a cardboard core at 28.5 m/minute. The residual plasticizer was 0.4 wt % as determined by thermogravimetric analysis. As the solvent was free of halogen-containing compounds, the extracted sheet was also free of residual halogen-containing compounds.

Physical properties of the manufactured separator are shown in Table III.

TABLE III

| Name | Emveco Thickness (μm) | Basis weight (g/m2) | Porosity (%) | Gurley (sec/100 c) |
|---|---|---|---|---|
| Ex 4 | 11.5 | 3.7 | 67 | 46 |

Example 5

Polymer powders A thru C were individually weighed out into Aluminum pans and then placed on a tray in a glass vessel that was suspended in about 0.5 liters of dichloromethylene (DCM). The vessel was then closed and sealed with a glass lid, and the polymer powders were allowed to adsorb/absorb the methylene chloride vapor for 24 hrs at room temperature (19° C.). The powder samples were then immediately weighed upon removal from the vessel, and the weight gain was calculated. The samples were then re-weighed after sitting in a fume hood for 30 mins. The data are shown in Table IV below.

TABLE IV

| Sample | A | B | C |
|---|---|---|---|
| PE Grade | UHMWPE | VHMWPE | HMW-HDPE |
| Approx Molecular Weight (Millions g/mol) | 5.0 | 1.0 | 0.6 |
| Al pan | 2.208 | 2.2302 | 2.2206 |
| Al pan + PE | 18.7006 | 20.8746 | 23.1714 |
| wt after 24 hrs DCM exposure in closed glass vessel | 19.24 | 21.47 | 24.35 |
| DCM wt | 0.54 | 0.60 | 1.18 |
| % pick up | 3.3 | 3.2 | 5.6 |
| wt after 24 hrs DCM exposure followed by 30 min under hood | 18.7112 | 20.8874 | 23.2086 |
| DCM wt | 0.0106 | 0.0128 | 0.0372 |
| % pick up | 0.0643 | 0.0687 | 0.1776 |

The invention claimed is:

1. A method for the manufacture of a microporous polyolefin membrane, comprising:

melt blending a polyolefin and a plasticizer to form a mixture;

casting or extruding the mixture into a non-porous sheet;

cooling the non-porous sheet to induce phase separation of the polyolefin and plasticizer; and extracting the plasticizer from the non-porous sheet with a halogen-free solvent and evaporating the solvent to form a microporous polyolefin membrane, wherein the halogen-free solvent comprises a flashpoint above about 23° C. with an initial boiling point at least about 50° C. lower than a flashpoint of the plasticizer;

wherein the method is performed using a closed-loop, solvent extraction, drying, and solvent recovery system.

2. A method for the manufacture of a microporous polyolefin membrane, comprising:

melt blending a polyolefin and a plasticizer to form a mixture;

casting or extruding the mixture into a non-porous sheet;

cooling the non-porous sheet to induce phase separation of the polyolefin and plasticizer; and extracting the plasticizer from the non-porous sheet with a halogen-free solvent and evaporating the solvent to form a microporous polyolefin membrane, wherein the halogen-free solvent comprises an isoparaffin having a flashpoint of about 38° C. to about 66° C. with an initial boiling point at least about 50° C. lower than a flashpoint of the plasticizer.

3. The method of claim 2, wherein the polyolefin comprises a polyethylene having a molecular weight of at least about 0.5 million g/mol.

4. The method of claim 2, wherein the plasticizer comprises a flashpoint greater than about 215° C. and an aniline point between about 70-140° C.

5. The method of claim 2, wherein the halogen-free solvent comprises an initial boiling point at least about 85° C. lower than the flashpoint of the plasticizer.

6. The method of claim 1, wherein the halogen-free solvent comprises a flashpoint greater than about 38° C.

7. The method of claim 1, wherein the closed-loop, solvent extraction, drying, and solvent recovery system includes a closed-loop, solvent extraction, drying, and carbon bed recovery system.

8. The method of claim 1, further comprising:
stretching or biaxially orienting the non-porous sheet prior to solvent extraction of the plasticizer from the polyolefin.

9. The method of claim 8, further comprising:
stretching or biaxially orienting the microporous polyolefin membrane after plasticizer extraction and solvent evaporation.

10. The method of claim 1, further comprising annealing or heat stabilizing the microporous polyolefin membrane prior to winding.

11. The method of claim 2, wherein the microporous polyolefin membrane is free of halogen-containing compounds.

12. The method of claim 2, wherein the microporous polyolefin membrane has a backweb thickness of about 25 microns or less.

13. The method of claim 2, wherein the microporous polyolefin membrane has a backweb thickness of about 150 microns to about 300 microns.

14. The method of claim 2, wherein the mixture further comprises a filler distributed throughout the mixture, wherein the filler comprises alumina, silica, zirconia, titania, mica, boehmite, magnesium hydroxide, calcium carbonate, hydrotalcites, or mixtures thereof.

15. The method of claim 2, wherein the halogen-free solvent is a food grade solvent.

16. The method of claim 2, wherein the microporous polyolefin membrane contains about 10-25 wt % residual plasticizer.

17. The method of claim 2, further comprising:
stretching or biaxially orienting the non-porous sheet prior to solvent extraction of the plasticizer from the polyolefin.

18. The method of claim 17, further comprising:
stretching or biaxially orienting the microporous polyolefin membrane after plasticizer extraction and solvent evaporation.

19. The method of claim 1, wherein the closed-loop, solvent extraction, drying, and solvent recovery system includes a closed-loop, solvent extraction, drying, and vapor condensing recovery system.

20. The method of claim 2, wherein the isoparaffin includes a C10-C13 isoparaffin.

21. The method of claim 2, wherein the isoparaffin has a flashpoint of about 44° C. to about 66° C.

* * * * *